(12) United States Patent
Freire et al.

(10) Patent No.: US 11,496,081 B2
(45) Date of Patent: Nov. 8, 2022

(54) ESTIMATING ROTOR OPERATIONAL PARAMETER

(71) Applicant: Siemens Gamesa Renewable Energy A/S, Brande (DK)

(72) Inventors: Nuno Miguel Amaral Freire, Brande (DK); Zhan-Yuan Wu, Sheffield (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 53 days.

(21) Appl. No.: 17/063,858

(22) Filed: Oct. 6, 2020

(65) Prior Publication Data

US 2021/0104966 A1   Apr. 8, 2021

(30) Foreign Application Priority Data

Oct. 8, 2019  (EP) .................................. 19202029

(51) Int. Cl.
H02P 21/18 (2016.01)
H02K 29/03 (2006.01)

(52) U.S. Cl.
CPC ............. *H02P 21/18* (2016.02); *H02K 29/03* (2013.01)

(58) Field of Classification Search
CPC .. H02P 21/18; H02P 6/182; H02P 6/17; H02P 9/009; H02P 21/24; H02P 2101/15;
(Continued)

(56) References Cited

U.S. PATENT DOCUMENTS 9,571,017 B2 * 2/2017 Hirotani ................. H02P 25/22
10,543,868 B2 * 1/2020 Mori ....................... H02P 21/05
(Continued)

FOREIGN PATENT DOCUMENTS

FR    2967529 A1   5/2012
WO    2019030138 A1   2/2019

OTHER PUBLICATIONS

Zhu Shaohong et al: "Novel 24-slots14-poles fractional-slot concentrated winding topology with low-space harmonics for electrical machine", The Journal of Engineering, The Institution of Engineering and Technology, Michael Faraday House, Six Hills Way, Stevenage, Herts. SG1 2AY, UK, vol. 2019, No. 17, pp. 3784-3788, XP006085434, DOI: 10.1049/JOE.2018.8085, the whole document; 2019.
(Continued)

*Primary Examiner* — Bickey Dhakal
(74) *Attorney, Agent, or Firm* — Schmeiser, Olsen & Watts LLP (57) ABSTRACT

Provided is a method of estimating a rotor operational parameter of an electrical machine including multiple winding sets wound to have a phase-shift between winding sets, the rotor operational parameter including rotor position and/or rotor speed, the method including: deriving, for each winding set, a preliminary rotor operational parameter based on a current and a voltage of the respective winding set; calculating for at least two winding sets and for at least one predefined harmonic, a rotor operational parameter harmonic correction term based on the preliminary rotor operational parameter of at least two winding sets; calculating for at least one winding set, a corrected rotor operational parameter based on the preliminary operational parameter of this winding set and the rotor operational parameter harmonic correction term of this winding set, wherein in particular the corrected rotor operational parameter has at least one predefined harmonic removed or at least attenuated.

16 Claims, 4 Drawing Sheets

(58) Field of Classification Search
CPC ...... H02P 2103/20; H02P 29/50; H02P 21/05; H02P 6/10; H02K 29/03; Y02E 10/72
See application file for complete search history.

(56) References Cited

U.S. PATENT DOCUMENTS 10,879,821 B2* 12/2020 Lakshmi Narasimha ................... H02P 21/13
2007/0132424 A1* 6/2007 Takao .................... H02P 21/24 318/806
2020/0036269 A1* 1/2020 Sugiura ................... H02K 9/22

OTHER PUBLICATIONS

Hollstegge Philipp et al: "Dual three-phase machine modeling and control including saturation, rotor position dependency and reduction of low current harmonics", 2017 7th International Electric Drives Production Conference (EDPC), IEEE, pp. 1-9, XP033342476, DOI: 10.1109/EDPC.2017.8328165, retrieved on Mar. 29, 2018, the whole document *; 2017.

European Search Report dated Mar. 24, 2020 for Application No. 19202029.5.

Morimoto, Shigeo, et al. "Sensorless control strategy for salient-pole PMSM based on ex-tended EMF in rotating reference frame", IEEE Transactions on Industry Applications, vol. 38, No. 4, Jul./Aug. 2002.

* cited by examiner

ESTIMATING ROTOR OPERATIONAL PARAMETER

CROSS-REFERENCE TO RELATED APPLICATIONS

This application claims priority to EP Application No. 19202029.5, having a filing date of Oct. 8, 2019, the entire contents of which are hereby incorporated by reference.

FIELD OF TECHNOLOGY

The following relates to a method and to an arrangement of estimating a rotor operational parameter of an electrical machine comprising multiple winding sets wound to have a phase-shift between winding sets. Embodiments of the invention further relate to a controller for controlling an electric generator comprising the arrangement.

BACKGROUND

A synchronous machine comprises a stator and a rotor rotatable relative to the stator. The stator may comprise one or more multiphase winding sets and the rotor may comprise permanent magnets. The machine may be an externally excited machine.

The knowledge of rotor speed and position is a requirement for controlling a permanent magnet synchronous machine. Estimation methods are usually adopted to avoid extra sensors and reduce hardware requirements, which are implemented in the converter control system. Speed/position estimators employing an EMF-based observer are a conventional choice, which make use of measured currents and reference voltages readily available in the control systems.

The publication "Sensorless control strategy for salient-pole PMSM based on extended EMF in rotating reference frame" by Morimoto, IEEE Transactions on Industry Applications, vol. 38, no. 4, July/August 2002 discloses a control strategy for salient-pole permanent magnet synchronous motor (PMSM). Thereby, a model of a salient-pole PMSM using an extended electromotive force (EMF) in the rotating reference frame is utilized to estimate both position and speed of a rotor.

Concerning high power permanent magnet generator, non-negligible harmonics are present in aforementioned current and voltage signals, which are not considered in the observer model and therefore need to be somehow attenuated to avoid observer misbehaviour and consequent estimation errors. Errors in the estimated position are critical for the overall control performance and may cause control instability, and an attempt at attenuating harmonics by means of digital filters would introduce extra errors in the speed and position due to phase delay.

The presence of harmonics in the feedback signals (currents and voltages) used by a back-EMF based speed observer may lead to inaccurate speed estimation and/or position estimation of the rotor. Therefore, it is desired to attenuate such harmonic content, in order to improve the performance of the speed observation method.

It has been observed, that conventional methods do not in all circumstances and in all configurations of the generator provide sufficient accurate estimations of position and/or speed of the rotor. Thus, there may be a need for a method and an arrangement of estimating a rotor operational parameter of an electrical machine comprising multiple winding sets wound to have a phase-shift between winding sets, the rotor operational parameter comprising rotor position and/or rotor speed, wherein the accuracy of the estimated rotor position and/or rotor speed is improved compared to conventional methods.

SUMMARY

According to an embodiment of the present invention it is provided a method of estimating a rotor operational parameter of an electrical machine comprising multiple winding sets wound to have a phase shift between winding sets, the rotor operational parameter comprising rotor position and/or rotor speed, the method comprising: deriving, for each winding set, a preliminary rotor operational parameter based on a (e.g. measured) current and a (e.g. reference) voltage of the respective winding set; calculating for at least two winding sets and for at least one predefined harmonic, a rotor operational parameter harmonic correction term based on the preliminary rotor operational parameter of at least two (or three or all) winding sets; calculating for at least one winding set, a corrected rotor operational parameter based on the preliminary operational parameter of this winding set and the rotor operational parameter harmonic correction term of this winding set, wherein in particular the corrected rotor operational parameter has the at least one predefined harmonic removed or at least attenuated.

Thus, embodiments of the present invention provide a simple solution for removing dominant harmonics in the estimated position and speed in phase-shifted multi-winding machines, namely fractional slot concentrated winding (FSCW) machines. Embodiments of the present invention thereby enable to avoid the implementation of additional filters (to attenuate the undesired harmonics).

The method may be implemented partly in hardware and/or in software, for example as a module or a unit in a controller of a generator, in particular a wind turbine controller.

The electrical machine may comprise a rotor having permanent magnets mounted. The electric machine may be a generator, in particular a generator of a wind turbine. Each winding set may provide a number of electrical phases, such as two, three, four, five, six or a larger number of phases, e.g. The electrical machine may comprise multiple winding sets, and the phase-shift between winding sets may relate to an electrical phase-shift, i.e. a phase difference between fundamental voltages measured at two different winding sets upon rotation of the rotor. The phase-shift may also relate to a constructional/physical displacement of corresponding wires of two winding sets as an angle shift in the circumferential direction where the corresponding winding sets are arranged at the stator. The winding set phase-shift may be a phase-shift between for example a first winding set and a second winding set.

The preliminary rotor operational parameter may for example be derived as is described in the above publication "Sensorless control strategy for salient-pole PMSM based on extended EMF in rotating reference frame". The preliminary rotor operational parameter may erroneously comprise one or more error components which oscillate with the at least one predefined harmonic. The method may be capable of correcting the preliminary rotor operational parameter for more than one predefined harmonic, such as two, three, four or even more predefined harmonics. The predefined harmonic may depend on the configuration of the electrical machine, in particular depend on the number of winding sets and/or the phase-shifts between winding sets. The electrical machine may comprise at least two winding sets or even three winding sets, four winding sets, five winding sets or even more winding sets. The current or currents of one winding set may be measured, the voltage or voltages of the winding set may be measured or may be reference voltages.

Calculating the rotor operational parameter harmonic correction term for a particular winding set requires to receive a preliminary rotor operational parameter of at least one other winding set. The rotor operational parameter harmonic correction term may correct for the (one or more) undesired harmonic component as comprised in the preliminary rotor operational parameter. Calculating the rotor operational parameter harmonic correction term may thereby also depend on the phase-shift between winding sets. The respective rotor operational parameter harmonic correction term may for example involve to subtract a preliminary rotor operational parameter of the considered winding set from a preliminary rotor operational parameter from another winding set from which additionally for example the phase-shift between the winding sets may be subtracted. Thus, calculating the rotor operational parameter harmonic correction term may be obtained by a subtraction and/or summation operation of the preliminary rotor operational parameter of the at least two winding sets (including the winding set under consideration and at least one other winding set) and involving the phase-shift between the winding sets. Thus, an arithmetic unit may be applied for calculating the rotor operational parameter harmonic correction term. In particular, this harmonic correction term may be based on the preliminary rotor operational parameter of at least two or three or all winding sets comprised in the electrical machine.

The corrected rotor operational parameter may be corrected for the (one or more) undesired harmonic component and may be obtained also by performing simple arithmetics for example involving a subtraction of the correction term from the preliminary rotor operational parameter.

The rotor operational parameter may for example comprise one or more components, such as the rotor position and/or the rotor speed. When the corrected rotor operational parameter is essentially free from the one or more predefined harmonic components, the corrected rotor operational parameter may advantageously be used in one or more control modules of a generator controller without requiring any additional filtering. Furthermore, the accuracy of the estimation of the rotor operational parameter may thereby be improved.

The method may be applied for any number of winding sets, such as two winding sets, three winding sets, four winding sets, five winding sets, six winding sets or even more winding sets. The method may be applied for any number of phases, such as two phases, three phases, four phases, five phases or even more phases. Furthermore, the method may be adapted to attenuate or substantially remove more than one predefined harmonic, such as two, three, four, five or even more predefined harmonic. This may depend on the configuration of the electrical machine, in particular depending on the number of winding sets and/or the phase-shift between the winding sets.

The electrical machine may comprise a stator having the winding sets wound or arranged in a number of different winding topologies, including for example concentrated winding topology and distributed winding topology. Thereby, the method is applicable to a number of conventionally configured electrical machines.

According to an embodiment of the present invention, calculating the rotor operational parameter harmonic correction term comprises: calculating a rotor position harmonic correction term based on a preliminary rotor position of at least two winding sets; and/or calculating a rotor speed harmonic correction term based on a preliminary rotor speed of the at least two winding sets.

Thereby, conventionally needed rotor operational parameters, i.e. the rotor position and the rotor speed, may be supported to be estimated by the method. The rotor position may for example be given as an angle position in the circumferential direction of the rotor relative to a reference position. The rotor speed may for example be given in rpm. Rotor position and rotor speed may be needed in for example any transformation module of a controller.

According to an embodiment of the present invention, calculating the corrected rotor operational parameter comprises: calculating a corrected rotor position based on the preliminary rotor position of this winding set and the rotor position harmonic correction term of this winding set; and/or calculating a corrected rotor speed based on the preliminary rotor speed of this winding set and the rotor speed harmonic correction term of this winding set.

The corrected rotor position and/or rotor speed may directly be input to a control module or control element requiring rotor position and/or rotor speed without additionally applying a filter element. The respective corrected rotor operational parameter may also be derived by applying simple arithmetics, for example subtracting the respective rotor operational parameter harmonic correction term from the preliminary rotor operational parameter, namely the preliminary rotor position/rotor speed. Thereby, the calculation can be performed in a simple manner.

According to an embodiment of the present invention, the at least two winding sets include the winding set for which the respective correction term is calculated and at least one other winding set. The other winding set may be phase-shifted relative to the winding set for which the respective correction term is calculated by the phase-shift between the winding sets. In the calculation with respect to a predefined harmonic it may be assumed that the respective positions of the rotor relative to the different winding sets are also in particular phase-shifted by the product of the harmonic and the phase-shift between the winding sets. Thus, the rotor position harmonic correction term may depend on the phase-shift between the winding sets and the predefined harmonic (expressed as an integer of a fundamental frequency, in particular fundamental electrical frequency).

According to an embodiment of the present invention, the calculation of the rotor position harmonic correction term is further based on the winding set phase shift. The rotor position harmonic correction term may for example be dependent on a difference between the preliminary rotor position of the winding set under consideration and the preliminary rotor position of the other (e.g. an immediately adjacent) winding set further diminished by the phase-shift between the winding sets, wherein the result may be divided by 2. Thereby, the correction term is easily calculatable.

According to an embodiment of the present invention, the at least one predefined harmonic to be attenuated in the harmonic corrected rotor operational parameter include the harmonic $h\_0=2\pi/(n\gamma)$, wherein n is the number of winding sets and $\gamma$ is the phase shift between the winding sets, wherein the number of phases in each winding set is in particular three. The harmonic $h\_0$ may be considered as the most dominant harmonic given the configuration of the generator or electrical machine, namely given the number of winding sets and the phase-shift between the winding sets. It may be highly desirable to attenuate errors in this dominant harmonic $h\_0$, as is possible by this embodiment.

According to an embodiment of the present invention, the at least one predefined harmonic to be attenuated in the harmonic corrected rotor operational parameter include the harmonic $h\_k = 2\pi/(n\gamma)(1+2k/(n-1))$, wherein n is the number of winding sets and $\gamma$ is the phase shift between the winding sets, k is an integer equal or larger than 0, wherein the number of phases in each winding set is in particular three. Thereby, also multiples of the dominant harmonic may be targeted by embodiments of the present invention to also attenuate higher harmonics of the dominant harmonic. Thereby, the accuracy of the estimation of rotor position and/or rotor speed may further be improved.

According to an embodiment of the present invention, the at least one predefined harmonic comprises a first predefined harmonic and at least one second predefined harmonic, wherein the first predefined harmonic $h\_1$ to be attenuated in the harmonic corrected rotor operational parameter is $h\_1 = 2\pi/(n\gamma)(1+2k\_1/(n-1))$, wherein the second predefined harmonic $h\_2$ to be attenuated in the harmonic corrected rotor operational parameter is $h\_2 = 2\pi/(n\gamma)(1+2k\_2/(n-1))$, wherein n is the number of winding sets and $\gamma$ is the winding set phase shift between the winding sets, $k\_1$, $k\_2$ are integers equal or larger than 0, wherein $k\_1$ is not equal to $k\_2$, wherein the number of phases is in particular three, wherein in particular: the electrical machine has three winding sets, wherein the winding set phase shift is 20°, wherein $k\_1=0$ and $k\_2=1$, wherein the first harmonic is the $6^{th}$ harmonic and the second harmonic is the $12^{th}$ harmonic.

Thus, embodiments of the present invention allow attenuation of at least two predefined harmonics or even more predefined harmonics in the preliminary rotor operational parameter (harbouring the harmonic errors). It may only be possible to at the same time attenuate or remove particular combinations of different harmonics (e.g. multiples of the at least one predefined harmonics) which may depend on the configuration and construction of the electrical machine.

According to an embodiment of the present invention, the electrical machine has two, in particular three-phase, winding sets, wherein the winding set phase shift is 30° and the predetermined harmonic is the $6^{th}$ harmonic (e.g. and may also include the $18^{th}$ harmonic) and/or wherein the winding set phase shift is 90° and the predetermined harmonic is the $2^{nd}$ harmonic. Thereby, a typically configured electrical machine is supported. In particular, simultaneous cancellation of 2f and 6f harmonics in the corrected rotor operation parameter may be possible.

According to an embodiment of the present invention, the electrical machine has three, in particular three-phase, winding sets, wherein the winding set phase shift is 20° (or) 40° and the predetermined harmonics are the $6^{th}$ and the $12^{th}$ harmonic.

According to an embodiment of the present invention, the electrical machine has four, in particular three-phase, winding sets, wherein the phase shift between winding sets is for example equally defined at 15° and the first predetermined harmonic is the $6^{th}$ harmonic and/or (wherein the winding set phase shift is 15°, for example) and the second predetermined harmonic is the $12^{th}$ harmonic.

According to an embodiment of the present invention, an electrical machine is configured as a fractional slot type having a multiple winding set stator, in particular having concentrated winding topology or distributed winding topology, wherein the electrical machine comprises in particular a rotor having permanent magnets. Thereby, conventionally available electrical machines may be supported.

The stator of the electrical machine may for example be a segmented stator. The concentrated winding topology may be characterized in that a coil belonging to one phase may be wound or arranged around one tooth. The distributed winding topology may be characterized in that a coil of one phase may surround more than one tooth, such as two, three, four, six or even more teeth. The fractional slot multiple winding set stator may be characterized by a fractional slot per pole and per phase number, i.e. number of slots divided by the number of poles and divided by the number of phases is different from an integer number Concentrated winding machines may only be fractional slot machines, but distributed winding machines may be integer or fractional slot machines.

According to an embodiment of the present invention it is provided a method of controlling an electrical machine comprising multiple winding sets wound to have phase-shift between winding sets, the method comprising: performing a method according to one of the preceding embodiments; and controlling the electrical machine based on the corrected rotor operational parameter of at least one winding set.

The method may for example be executed or performed by a controller of the electrical machine, in particular a generator controller or may in particular be performed by a wind turbine controller. The improved estimation of the rotor operational parameter may for example be utilized in the following control elements: frame transformations; adaptive filters; and decoupling terms in fundamental current controller.

It should be understood, that features, individually or in any combination, disclosed, described, applied or provided for a method of estimating rotor operational parameter of an electrical machine may also be applicable, individually or in any combination, to an arrangement for estimating a rotor operational parameter of an electrical machine comprising multiple winding sets according to embodiments of the present invention and vice versa.

According to an embodiment of the present invention it is provided an arrangement for estimating a rotor operational parameter of an electrical machine comprising multiple winding sets wound to have a phase shift between winding sets, the rotor operational parameter comprising rotor position and/or rotor speed, the arrangement comprising a processor adapted: to derive, for each winding set, a preliminary rotor operational parameter based on a current and a voltage of the respective winding set; to calculate for at least two winding sets and for at least one predefined harmonic, a rotor operational parameter harmonic correction term based on the preliminary rotor operational parameter of at least two winding sets; to calculate for at least one winding set, a corrected rotor operational parameter based on the preliminary operational parameter of this winding set and the rotor operational parameter harmonic correction term of this winding set.

The arrangement may be implemented for example by a general purpose processor which may execute a computer program comprising instructions to perform the method steps.

According to an embodiment of the present invention it is provided a controller for controlling an electric generator, in particular of a wind turbine, the controller comprising: an arrangement according to the preceding embodiment; and at least one control element receiving as input the corrected rotor operational parameter.

Furthermore, a wind turbine comprising the control and further comprising the electrical machine, in particular a generator, is provided.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein.

DETAILED DESCRIPTION

Embodiments of the present invention are now described with reference to the accompanying drawings. Embodiments of the invention are not restricted to the illustrated or described embodiments. The illustration in the drawings is in schematic form.

Figure 1:
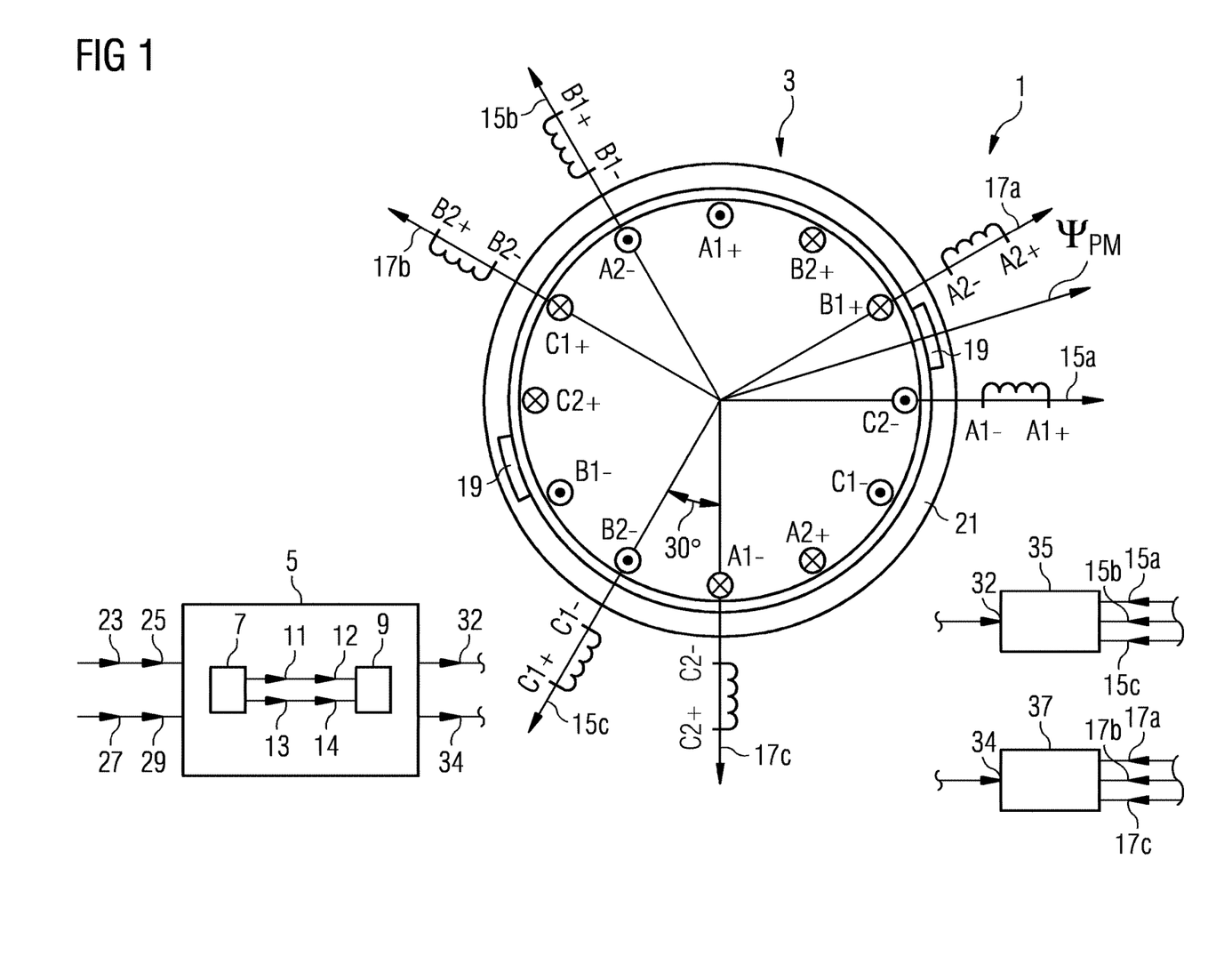
FIG. 1 schematically illustrates a generator system including a controller for controlling the electric generator according to an embodiment of the present invention.

The generator system 1 schematically illustrated in FIG. 1 comprises an electrical machine 3 and a controller 5 according to an embodiment of the present invention for controlling the electric generator 3. The controller 5 comprises an arrangement 7 for estimating a rotor operational parameter of an electrical machine comprising multiple winding sets wound to have a phase-shift between winding sets and at least one control element 9 which receives as input the corrected rotor operational parameter 11,13 for at least one winding set. In general corrected rotor operational parameter may include the corrected rotor position θ1ˆ (11) of the first winding set and the corrected rotor position θ2ˆ (12) of the second winding set as well as the corresponding rotor speed ω1ˆ, ω2ˆ (13, 14).

The electrical machine 3 illustrated in FIG. 1 is an electrical machine comprising two winding sets namely having a first winding set 15 including wires wound in coils 15a, 15b, 15c and including a second winding set 17 namely formed by wires and coils 17a, 17b, 17c. In particular, the two winding sets are three-phase winding sets each providing a phase A, a phase B and a phase C. As can be appreciated from FIG. 1, the two winding sets 15, 17 are phase-shifted relative to each other by an electrical angle of 30°. The electrical machine 3 further comprises permanent magnets 19 mounted at a rotor 21, for example an outer rotor.

The arrangement 7 comprises a not explicitly illustrated processor which is adapted to receive (measured) currents 23 and currents 25 from the first winding set 15a, 15b, 15c and the second winding set 17a, 17b, 17c, respectively and further also receives a reference voltages 27 and 29 for the first winding set 15 and the second winding set 17, respectively.

Based on the currents 23, 25 and voltages 27, 29, the arrangement 7 derives for each corresponding winding set a preliminary rotor operational parameter (namely preliminary rotor position and preliminary rotor speed) based on currents 23, 25 and the voltages 27, 29. Furthermore, the arrangement 7 is arranged to calculate for the two winding sets 15a, 15b, 15c and 17a, 17b, 17c, and for at least one predefined harmonic, for example a 6$^{th}$ harmonic, a rotor operational parameter harmonic correction term (as will be described in detail below) based on the preliminary rotor operational parameters of the two winding sets. Furthermore, the arrangement 7 is adapted to calculate a corrected rotor operational parameter, namely the corrected rotor position θ1ˆ, θ2ˆ for the two winding sets 15, 17 as well as the corrected rotor speed ω1ˆ, ω2ˆ for the two winding sets as is also labelled with reference signs 11, 12, 13, 14.

The controller 5 outputs control signals 32, 34. Thereby, the control signal 32 may for example be supplied to a respective first converter 35 being connected with the first winding set 15a, 15b, 15c. The control signal 34 may for example be supplied to a second converter 37 being connected with the second winding set 17a, 17b, 17c, as is illustrated in FIG. 1.

Figure 2:
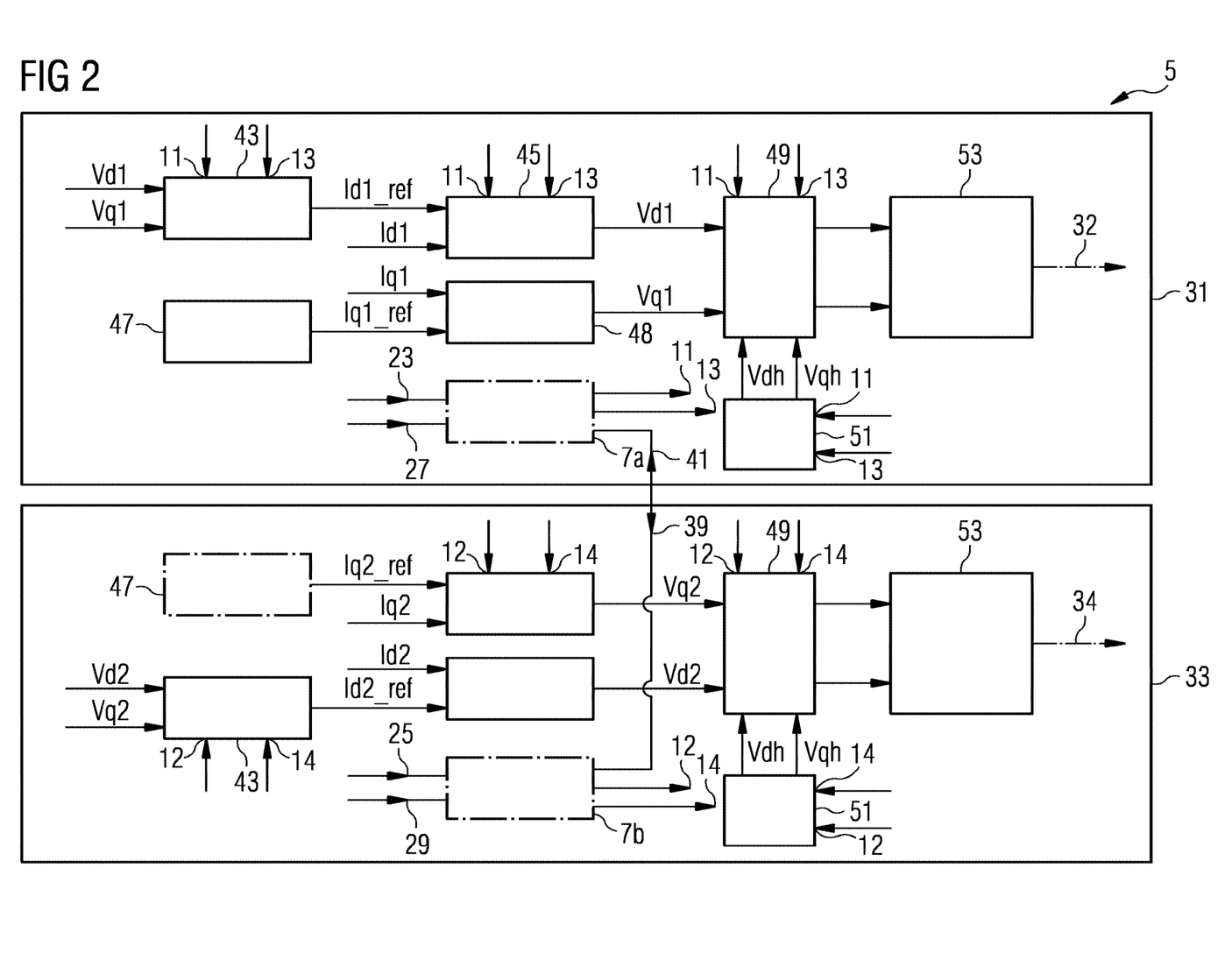
FIG. 2 schematically illustrates the controller illustrated in FIG. 1 comprising an arrangement for estimating a rotor operational parameter according to an embodiment of the present invention.

FIG. 2 illustrates the controller 5 in more detail in particular in an implementation of two separate but interacting controller portions 31, 33. However, the controller 5 may also be implemented as a single controller. The controller 5 as illustrated in FIG. 2 comprises a first controller portion 31 controlling the first winding set 15a, 15b, 15c and comprises a second controller portion 33 controlling the second winding set 17a, 17b, 17c by generating and supplying respective control signals 32 and 34.

The controller 5 comprises an arrangement 7 which is configured having a first arrangement portion 7a and a second arrangement portion 7b. The arrangement portions 7a receives the current 23 and the voltage 27 of the first winding set 15a, 15b, 15c and the arrangement portion 7b receives the current 25 and the voltage 29 of the second winding set 17a, 17b, 17c. From the respective current and voltage of each winding set, the respective arrangement portion 7a, 7b computes a preliminary rotor operational parameter which is denoted below by θ1, ω1 (39) for the first winding set and θ2, ω2 (41) for the second winding set. These preliminary rotor operational parameters (39, 41) are erroneous in that they contain higher harmonic contents.

For correcting for this harmonic error, the arrangement portions 7a, 7b calculate respective rotor operational parameter harmonic correction terms denoted below by θ$_{1,6}$ˆ, θ$_{2,6}$ˆ, wherein the second index indicates the harmonic to be attenuated. Based on the preliminary rotor operational parameters and the respective harmonic correction term, the arrangement portions 7a, 7b calculate the respective corrected rotor operational parameters, namely the corrected rotor position 11 (also denoted as θ1ˆ) of the first winding set and the corrected rotor speed 13 (also denoted as ω1ˆ) of the first winding set. The arrangement portion 7b thereby calculates the corrected rotor position 12 of the second winding set and the corrected rotor speed 14 of the second winding set. Thereby, the arrangement portions 7a, 7b are communicatively coupled in order to allow exchange of the preliminary rotor operational parameter 39 of the first winding set (including in particular preliminary rotor position and preliminary rotor speed) and exchanging the preliminary rotor operational parameter 41 of the second winding set (including also preliminary rotor position and preliminary rotor speed).

The corrected rotor position and rotor speed 11, 13 of the first winding set is input to several control elements, for example a modulation control element 43 which calculates based on voltages Vd1, Vq1 of the first winding set current references Id1_ref which is supplied to a current controller for the d-component of the current, i.e. element 45. Also, element 45 may receive the corrected rotor parameters 11, 13 of the first winding set. A DC link controller 47 calculates a reference Iq1_ref of a q-component of a current which is together with the measured q-component of the current Iq1 is supplied to a current controller 48 of the q-component. The current controllers 45, 48 output respective components Vd1, Vq1 of a voltage which are supplied to a voltage collector 49. The voltage collector may receive further inputs of voltages from other functions 51. The voltage collector 49 may also receive the corrected rotor parameters 11, 13 and derives therefrom voltage references which are supplied to a pulse width modulation module 53 which finally derives therefrom the converter control signal 32 for example including pulse width modulation signals which are supplied to gates of controllable switches within the first converter 35 (see FIG. 1).

The second controller portion 33 is similarly arranged as the first controller 31 and also correspondingly uses the corrected rotor operational parameters 12, 14 of the second winding set 17a, 17b, 17c in several control elements.

It should be understood that the embodiment illustrated in FIG. 1 only exemplarily describes the estimation method using a dual winding FSCW electrical machine 3 with 30° phase-shift for attenuating the $6^{th}$ harmonic in position and speed.

As is illustrated in FIG. 2, the controller is implemented in two distinct controller portions 31, 33 with the ability to communicate with each other for exchanging the preliminary rotor operational parameter 39, 41. Alternatively, the controller 5 may be implemented as a single controller. In the generator 3 illustrated in FIG. 1, the dominant harmonic would be 6f, thus the position estimates from both systems are given by (defining the preliminary rotor position and preliminary rotor speed):

$$\theta_1 = \theta_0 + \theta_{1,6}$$

$$\theta_2 = \theta_0 + 30 + \theta_{2,6}$$

wherein $\theta_0$ is a saw tooth signal free of harmonics varying between 0 and 360°. It is noted that the preliminary rotor position (e.g. included in the signals 39 and 41 in FIG. 2) contain a 6th harmonic which may therefore be described as, $$\theta_{1,6} = A_6 \sin(6\omega t + \phi)$$

$$\theta_{2,6} = A_6 \sin(6\omega t + \phi + \pi)$$

$$\theta_{2,6} = -\theta_{1,6}$$

Thereby, a rotor operational parameter harmonic correction term may be calculated as:

$$\hat{\theta}_{1,6} = \frac{\theta_1 - \theta_2 - 30}{2}$$

Based on this correction term and the preliminary rotor operational parameter, namely the preliminary rotor position, the following corrected rotor position may be calculated:

$$\hat{\theta}_1 = \theta_1 - \hat{\theta}_{1,6}$$

$$\hat{\theta}_2 = \theta_2 + \hat{\theta}_{1,6}$$

Similarly, the $6^{th}$ harmonics in speed may be calculated and employed for harmonic cancellation:

$$\hat{\omega}_{1,6} = \frac{\omega_1 - \omega_2}{2}$$

$$\hat{\omega}_{2,6} = -\hat{\omega}_{1,6}$$

From that harmonic correction term, the corrected rotor speed may be derived.

The compensation term (or correction terms) derived above are exemplarily given for the 6f cancellation in position and speed. The 6f is the predefined harmonic in this example.

Figure 3:
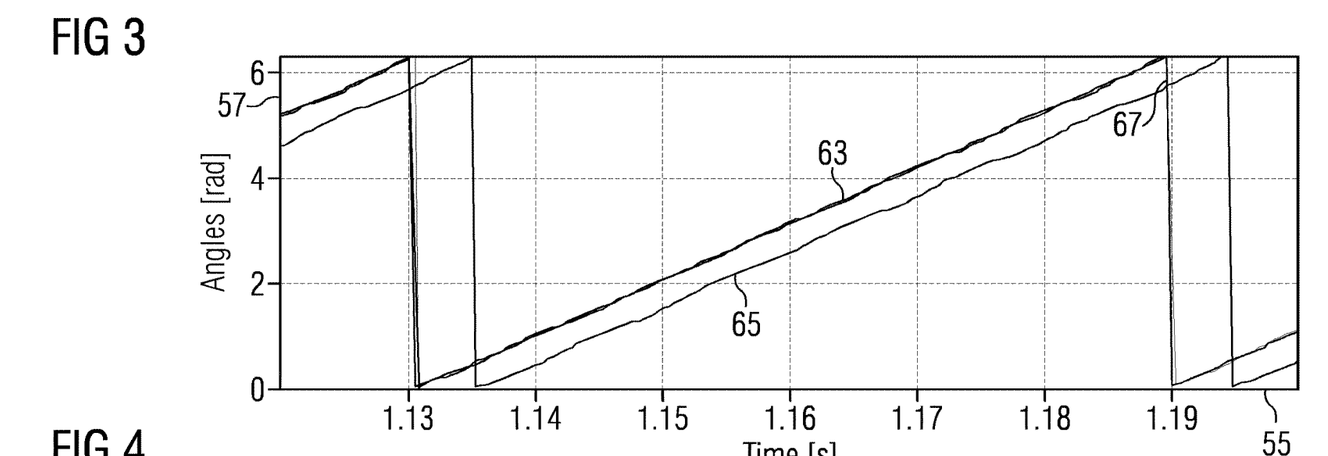
FIG. 3 illustrates a graph showing rotor operational parameters as estimated by embodiments of the present invention.
Figure 4:
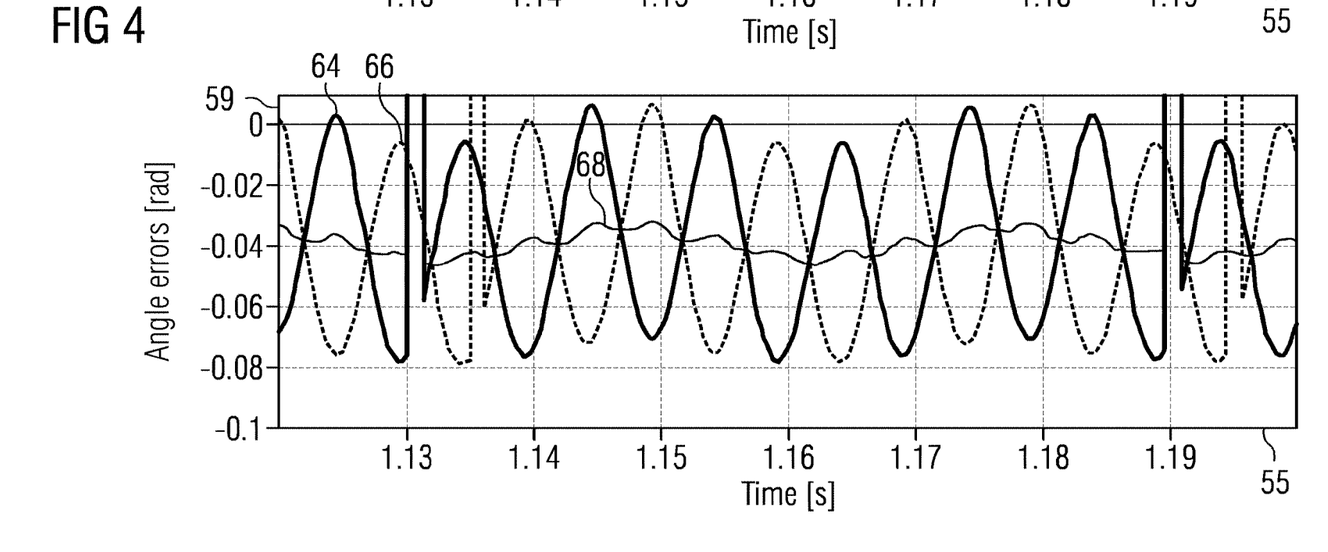
FIG. 4 illustrates a simulation result validating the estimation method.
Figure 5:
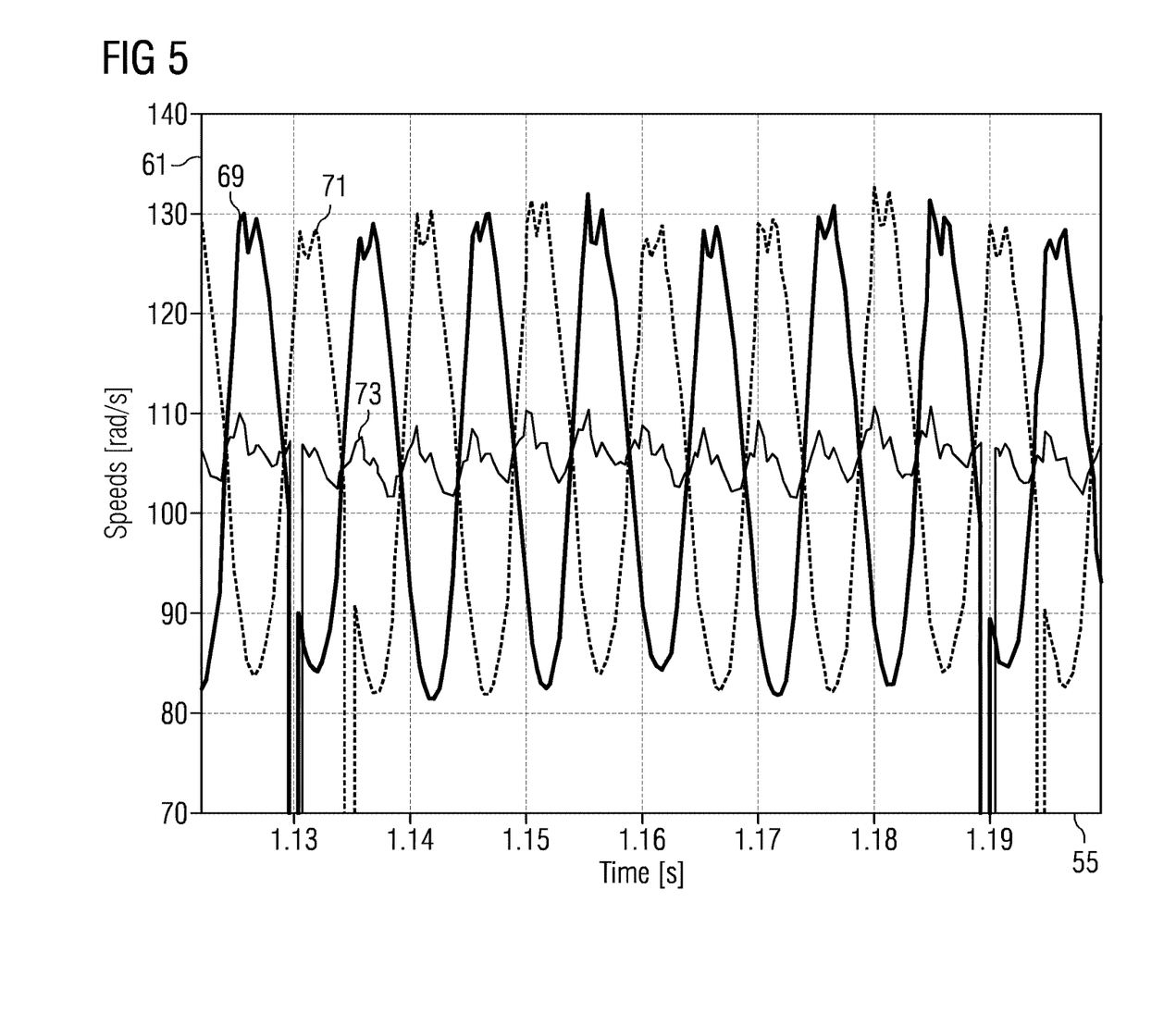
FIG. 5 illustrates simulation results validating the estimation method.

FIGS. 3, 4 and 5 illustrate simulation results validating the estimation method. Thereby, the abscissas 55 in FIGS. 3, 4, 5 indicate the time, while the ordinates 57, 59, 61 indicate the angle, the angle error and the speeds, respectively. In FIG. 3, the curve 63 indicates the preliminary rotor position of the first winding set, the curve 65 indicates the preliminary rotor position of the second winding set and the curve 67 indicates the corrected rotor position of the first winding set.

In FIG. 4, the curve 64 indicates the error in the rotor position of the preliminary rotor position of the first winding set, the curve 66 indicates the error in the preliminary rotor position of the second winding set and the curve 68 indicates the error in the corrected rotor position of the first winding set. It can be seen that the angle error of the estimation 68 of the rotor position of the first winding set is very small. Thereby, an effective cancellation of the dominant $6^{th}$ harmonic is achieved.

In FIG. 5, the curve 69 indicates the preliminary rotor speed as derived using the first winding set, the curve 71 indicates the preliminary rotor speed as derived using the second winding set and the curve 73 indicates the corrected rotor speed of the rotor. It can be seen that the rotor speed 73 does comprise only a very attenuated $6^{th}$ harmonic and is different from the preliminary rotor speeds 69, 71 as were conventionally estimated as rotor speed.

The method may be generalized for an arbitrary phase-shift and an arbitrary number of windings. Thereby, the method may be employed by any combination of phase-shift (γ) and number of windings (n) with the first, dominant harmonic (h_0) to cancel given by: h_0=2π/(nγ), with n equal or larger than 2.

An equation considering also the higher order harmonics being cancelled becomes more complex being derived as an example for a multiple three-phase machine: h_k=2π/(nγ)(1+2π/(n-1)), with k equal or larger than 0. Therefore, in the dual FSCW design with 30° phase-shift, apart from 6f ripple other harmonics such as 18f and 30f, etc. may also be removed from the estimated position and speed.

In case that is desirable for the 2f ripple to be removed from position and speed, the dual three-phase machine may be designed to have a phase shift of 90-degree. Other ripples such as 6f and 10f, etc. can be eliminated too. The method can also be extended easily for an arbitrary number of windings, provided that a given phase shift (γ) between winding sets is respected.

Some of the examples are:
1) For a triple three-phase machine, in which there is a 20 deg (or 40 deg) electrical phase shift between the systems, the 6f and 12f ripples in the estimated speed and position may be removed by using the three preliminary estimated angles and some manipulations, $$\begin{cases} \theta_1 = \theta_0 + \theta_{1,6} + \theta_{1,12} \\ \theta_2 = \theta_0 + 20 + \theta_{2,6} + \theta_{2,12} \\ \theta_3 = \theta_0 + 40 + \theta_{3,6} + \theta_{3,12} \end{cases}$$

Where $$\begin{cases} \theta_{1,6} = A_6 \sin(6\omega t) \\ \theta_{2,6} = A_6 \sin(6\omega t - 120) \\ \theta_{3,6} = A_6 \sin(6\omega t - 240) \end{cases}$$

$$\begin{cases} \theta_{1,12} = A_{12}\sin(12\omega t) \\ \theta_{2,12} = A_{12}\sin(12\omega t + 120) \\ \theta_{2,13} = A_{12}\sin(12\omega t + 240) \end{cases}$$

It should be noted that the initial angle in the harmonic angle is assumed to be zero, but can be any value without affecting the end results.
The angle that is 6f and 12f ripple-free can be derived as follows, $$\theta_0 = \frac{1}{3}[\theta_1 + (\theta_2 - 20) + (\theta_3 - 40)]$$

and the ripple in angle may be derived as, $$(\theta_{1,6} + \theta_{1,12}) = \theta_1 - \theta_0$$

The generator speed and its content of 6f and 12f ripple can be derived in a similar manner.

A quadruple three-phase machine may be designed such that two phase-shifts may be used for cancellation of 6f and 12f harmonics. The estimation of ripples in speed and position could be done by dividing the systems into two pairs.

A general formula for deriving respective corrected rotor operational parameters can be derived for a list of harmonics to be attenuated and which can then be cancelled for a given machine design.

Embodiments of the present invention may enable to arrive at estimations of rotor position and rotor speed having higher accuracy wherein in particular harmonics are attenuated. Thereby, improvement of overall control performance may be achieved. Furthermore, additional filters may be avoided which may simplify the design and further may increase the robustness. The method may be applicable or adapted for estimation of rotor position/speed in other multiple three-phase machines or machines having a different number than three phases.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating an electrical machine comprising multiple winding sets wound to have a phase shift between winding sets based on a rotor operational parameter, the rotor operational parameter including at least one of rotor position and rotor speed, the method comprising:
deriving, for each winding set, a preliminary rotor operational parameter based on a current and a voltage of the respective winding set;
calculating for at least two winding sets and for at least one predefined harmonic, a rotor operational parameter harmonic correction term based on the preliminary rotor operational parameter of at least two winding sets;
calculating for at least one winding set, a corrected rotor operational parameter based on the preliminary operational parameter of this winding set and the rotor operational parameter harmonic correction term of this winding set, wherein the corrected rotor operational parameter has the at least one predefined harmonic removed or at least attenuated; and
controlling the electrical machine based on the corrected rotor operational parameter calculated for the at least one winding set.

2. The method according to claim 1, wherein calculating the rotor operational parameter harmonic correction term comprises:
calculating a rotor position harmonic correction term based on a preliminary rotor position of at least two winding sets; and/or
calculating a rotor speed harmonic correction term based on a preliminary rotor speed of the at least two winding sets.

3. The method according to claim 1, wherein calculating the corrected rotor operational parameter comprises:
calculating a corrected rotor position based on the preliminary rotor position of this winding set and the rotor position harmonic correction term of this winding set; and/or
calculating a corrected rotor speed based on the preliminary rotor speed of this winding set and the rotor speed harmonic correction term of this winding set.

4. The method according to claim 1, wherein the at least two winding sets include the winding set for which the respective correction term is calculated and at least one other winding set.

5. The method according to claim 1, wherein the calculation of the rotor position harmonic correction term is further based on the winding set phase shift.

6. The method according to claim 1, wherein the at least one predefined harmonic to be attenuated in the corrected rotor operational parameter include the harmonic $h\_0 = 2\pi/(n\gamma)$, wherein n is the number of winding sets and $\gamma$ is the winding set phase shift between the winding sets.

7. The method according to claim 1, wherein the at least one predefined harmonic to be attenuated in the corrected rotor operational parameter include the harmonic $h\_k = 2\pi/(n\gamma)(1+2k/(n-1))$, wherein n is the number of winding sets and $\gamma$ is the winding set phase shift between the winding sets, k is an integer equal or larger than 0.

8. The method according to claim 1, wherein the at least one predefined harmonic comprises a first predefined harmonic and at least one second predefined harmonic,
wherein the first predefined harmonic $h\_1$ to be attenuated in the harmonic corrected rotor operational parameter is $h\_1 = 2\pi/(n\gamma)(1+2k\_1/(n-1))$,
wherein the second predefined harmonic $h\_2$ to be attenuated in the harmonic corrected rotor operational parameter is $h\_2 = 2\pi/(n\gamma)(1+2k\_2/(n-1))$,
wherein n is the number of winding sets and $\gamma$ is the winding set phase shift between the winding sets, $k\_1$, $k\_2$ are integers equal or larger than 0, wherein $k\_1$ is not equal to $k\_2$,
wherein:
the electrical machine has three winding sets, wherein the winding set phase shift is 20°, wherein $k\_1 = 0$ and k_2=1, wherein the first harmonic is the $6^{th}$ harmonic and the second harmonic is the $12^{th}$ harmonic.

9. The method according to claim 1, wherein the electrical machine has two winding sets,
wherein a first winding set phase shift is 30° and at least one predefined harmonic of the first winding set includes the $6^{th}$ harmonic and/or
wherein a second winding set phase shift is 90° and at least one predefined harmonic of the second winding set includes the $2^{nd}$ harmonic.

10. The method according to claim 1, wherein the electrical machine has three winding sets,
wherein a first winding set phase shift is 20° and first and second predefined harmonics of the first winding set are the $6^{th}$ and $12^{th}$ harmonics and/or
wherein a second winding set phase shift is 40° and first and second predefined harmonics of the second winding set are the $6^{th}$ and $12^{th}$ harmonics.

11. The method according to claim 1, wherein the electrical machine has four winding sets,
wherein a first winding set phase shift is 15° and a first predefined harmonic of the first winding set is the $6^{th}$ harmonic and/or
wherein a second winding set phase shift is 15° and a second predefined harmonic of the second winding set is the $12^{th}$ harmonic.

12. The method according to claim 1, wherein a stator of the electrical machine is configured as a fractional slot multiple winding set stator, wherein a concentrated winding topology or distributed winding topology,
wherein the electrical machine comprises a rotor having permanent magnets.

13. The method according to claim 1, wherein controlling based on the corrected rotor operational parameter calculated for the at least one winding set includes changing the rotor position and/or rotor speed.

14. An arrangement for controlling an electrical machine comprising multiple winding sets wound to have a phase shift between winding sets based on a rotor operational parameter, the rotor operational parameter comprising at least one of rotor position and rotor speed, the arrangement comprising:
a processor adapted:
to derive, for each winding set, a preliminary rotor operational parameter based on a current and a voltage of the respective winding set;
to calculate for at least two winding sets and for at least one predefined harmonic, a rotor operational parameter harmonic correction term based on the preliminary rotor operational parameter of at least two winding sets;
to calculate for at least one winding set, a corrected rotor operational parameter based on the preliminary operational parameter of this winding set and the rotor operational parameter harmonic correction term of this winding set; and
to control the electrical machine based on the corrected rotor operational parameter calculated for the at least one winding set.

15. A controller for controlling an electric generator of a wind turbine, the controller comprising:
the arrangement according to claim 14; and
at least one control element receiving as input the harmonic corrected rotor operational parameter.

16. The arrangement according to claim 15, wherein the at least one control element is configured to adjust the rotor position and/or rotor speed based on the received harmonic corrected rotor operational parameter.

* * * * *